United States Patent [19]

Ashihara et al.

[11] Patent Number: 5,017,445
[45] Date of Patent: May 21, 1991

[54] DRY CELL

[75] Inventors: Ryohei Ashihara, Neyagawa; Kikumitsu Suehiro, Kadoma; Kazuo Sugino; Jun Miyoshi, both of Hirakata; Masatsugu Eri, Kurume, all of Japan

[73] Assignee: Matsushita Electric Industrial Co., Ltd., Osaka, Japan

[21] Appl. No.: 446,769

[22] Filed: Dec. 6, 1989

Related U.S. Application Data

[63] Continuation-in-part of Ser. No. 291,787, Dec. 29, 1988, abandoned.

[30] Foreign Application Priority Data

Dec. 29, 1987 [JP]  Japan ................... 62-334457

[51] Int. Cl.$^5$ ............................................. H01M 4/62
[52] U.S. Cl. .................................... 429/224; 429/166; 429/232
[58] Field of Search ................ 429/224, 232, 166

[56] References Cited

U.S. PATENT DOCUMENTS

Re. 30,458 12/1980 Yetani et al. .................. 429/232 X
1,403,410 1/1922 Hazelett ........................... 429/166 X

FOREIGN PATENT DOCUMENTS 69004 1/1983 European Pat. Off. .

Primary Examiner—Stephen J. Kalafut
Attorney, Agent, or Firm—Wenderoth, Lind & Ponack

[57] ABSTRACT

A dry cell comprising an anode made of zinc and cathode mixture which includes manganese dioxide acting as active agent and conductor such that acetylene black having a specific surface area of 100 to 150 m$^2$/g measured by a BET type nitrogen gas adsorption method is used as the conductor by setting a mixing ratio in weight of the manganese dioxide to the acetylene black at 7/1 to 12/1.

4 Claims, 7 Drawing Sheets

DRY CELL

This is a continuation-in-part of Ser. No. 07/291,787, filed Dec. 29, 1988 now abandoned.

BACKGROUND OF THE INVENTION

The present invention generally relates to manganese dry cells and more particularly, to acetylene black in a cathode mixture of the manganese dry cells.

In conventional dry cells, acetylene black stipulated in JIS (Japanese Industrial Standards) K-1469 "Acetylene Black" 5.5 as such physical properties as a specific surface area of 40–65 $m^2/g$ and a quantity of absorbed hydrochloric acid of 14–18 cc. FIG. 1 shows relation between the specific surface area and the quantity of absorbed hydrochloric acid. As shown in FIG. 1, since an interrelation exists between the quantity of absorbed hydrochloric acid and the specific surface area of acetylene black, only the specific surface area of acetylene black is described, hereinbelow.

In a dry cell in which acetylene black acts as conductor and electrolyte consisting mainly of zinc chloride is used, mixing ratio in weight of manganese dioxide ($MnO_2$) to acetylene black, chereinbelow, referred to as "$MmO_{2a}/AB$ ratio"), ranges between 4/1 and 7/1 in practical use.

In electric discharge tests of a dry cell employing such known acetylene black, the dry cell connected to a load of 2 Ω is subjected to electric discharge for 30 min. at an interval of reset time or not less than 8 hours twice a day (hereinbelow, referred to as "2-Ω load type intermittent electric discharge") as stipulated in JIS. At this time, by setting a final discharge voltage to 0.9 V, FIGS. 2a and 2b show, respectively, total discharge duration and discharge efficiency expressed by ratio of actual discharge capacity to theoretical discharge capacity set under identical conditions. As will be seen from FIG. 2b, experiments on R20 (IEC Standards) type unit manganese dry cells have revealed that discharge performance deteriorates sharply at $MnO_2/AB$ ratio of 8/1 or more and discharge efficiency also drops below 50% at $MnO_2/AB$ ratio of 7/1 or less in the dry cells employing conventional acetylene black. Thus, if the known acetylene black is employed, $MnO_2/AB$ ratio is limited to 7/1 at its maximum. Meanwhile, if acetylene black having a large specific surface area is employed, its discharge efficiency at $MnO_2/AB$ ratio higher than 7/1 exceeds that obtained at the limit $MnO_2/AB$ ratio of 7/1 in the known acetylene black. However, in this case, discharge capacity of a dry cell employing this acetylene black during its storage at a high temperature of 45° C. deteriorates excessively.

SUMMARY OF THE INVENTION

Accordingly, an essential object of the present invention is to provide, with a view to eliminating the disadvantages inherent in conventional dry cells, a dry cell which employs acetylene black having physical properties, especially specific surface area limited to a predetermined range is employed as conductor in cathode mixture such that a mixing ratio of manganese dioxide to the acetylene black is maintained at a proper level.

In order to accomplish this object of the present invention, a dry cell according to the present invention comprises an anode made of zinc and cathode mixture which includes manganese dioxide acting as active agent and conductor, the improvement comprising: acetylene black having a specific surface area of 100 to 150 $m^2/g$ measured by a BET (Brunauer-Emmett-Teller) type nitrogen gas adsorption method, which is used as the conductor; and a mixing ratio in weight of the manganese dioxide to the acetylene black ranging from 7/1 to 12/1.

If specific surface area of acetylene black is in the range of 100 to 150 $m^2/g$ as shown in FIG. 1, quantity of absorbed hydrochloric acid ranges from about 20 to 26 cc. Therefore, in the present invention, even if $MnO_2/AB$ ratio is quite high, amount of water in the cathode mixture can be secured sufficiently. Furthermore, discharge efficiency during 2-Ω load type intermittent electric discharge can assume 50% or more when $MnO_2/AB$ ratio is not more than about 12/1.

Moreover, in the present invention, by restricting specific surface area of acetylene black to 100 to 150 $m^2/g$, generation of gas produced through reaction of manganese dioxide and acetylene black during storage of the dry cell can be restrained, so that the dry cell can well preserve its normal functions for a long time.

BRIEF DESCRIPTION OF THE DRAWINGS

This object and features of the present invention will become apparent from the following description taken in conjunction with the preferred embodiment thereof with reference to the accompanying drawings in which.

Before the description of the present invention proceeds, it is to be noted that like parts are designated by like reference numeral throughout several views of the accompanying drawings.

DETAILED DESCRIPTION OF THE INVENTION

Figure 1:
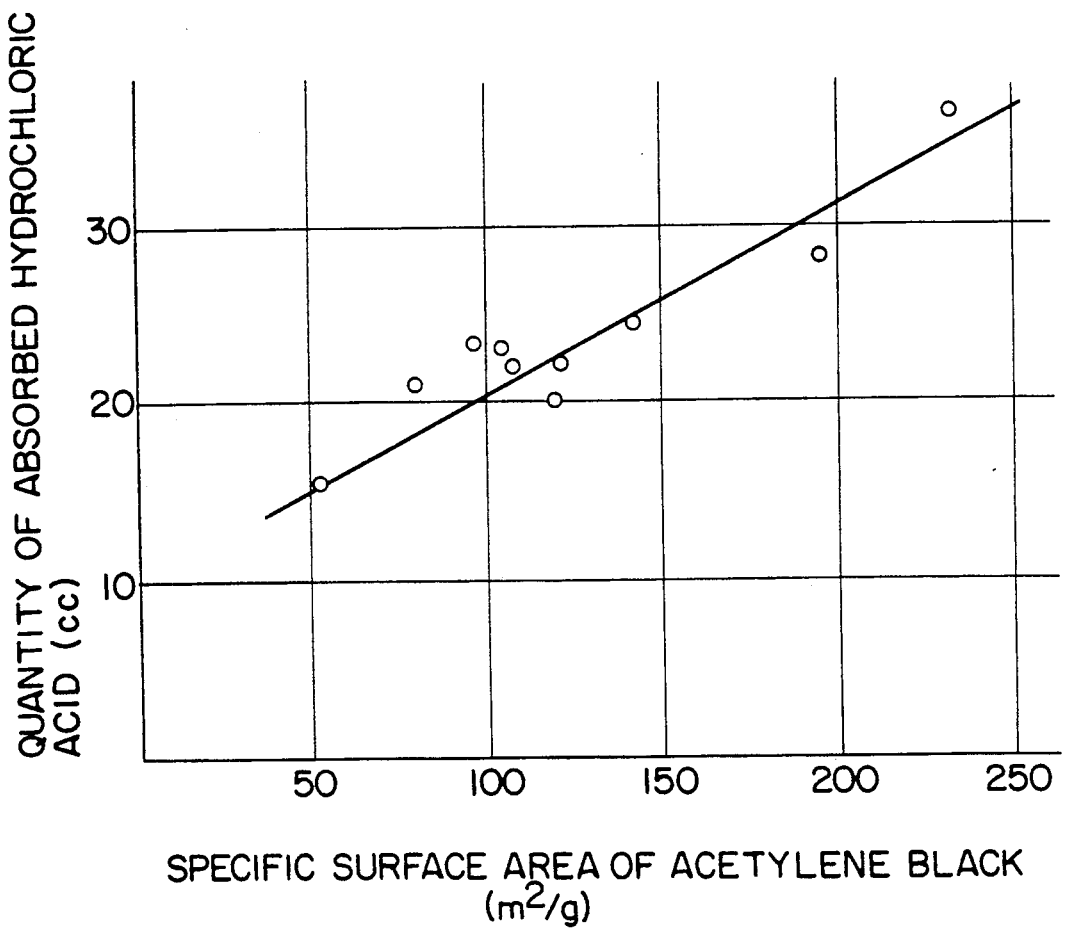
FIG. 1 is a graph showing the relation between specific surface area and quantity of absorbed hydrochloric acid in prior art acetylene black (already referred to)
Figure 2B:
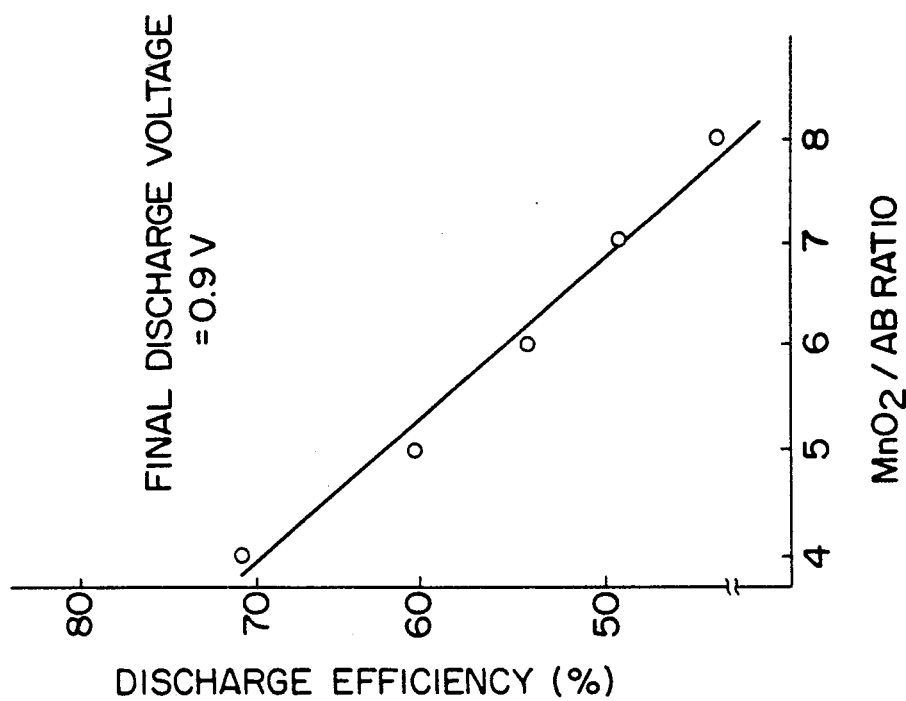
FIGS. 2a and 2b are graphs showing the relation between total discharge duration and $MnO_2/AB$ ratio and relation between discharge efficiency and $MnO_2/AB$ ratio in 2Ω load type intermittent electric discharge of an R20 (IEC Standards) type dry cell employing the prior art acetylene black of FIG. 1, respectively (already referred to)
Figure 2A:
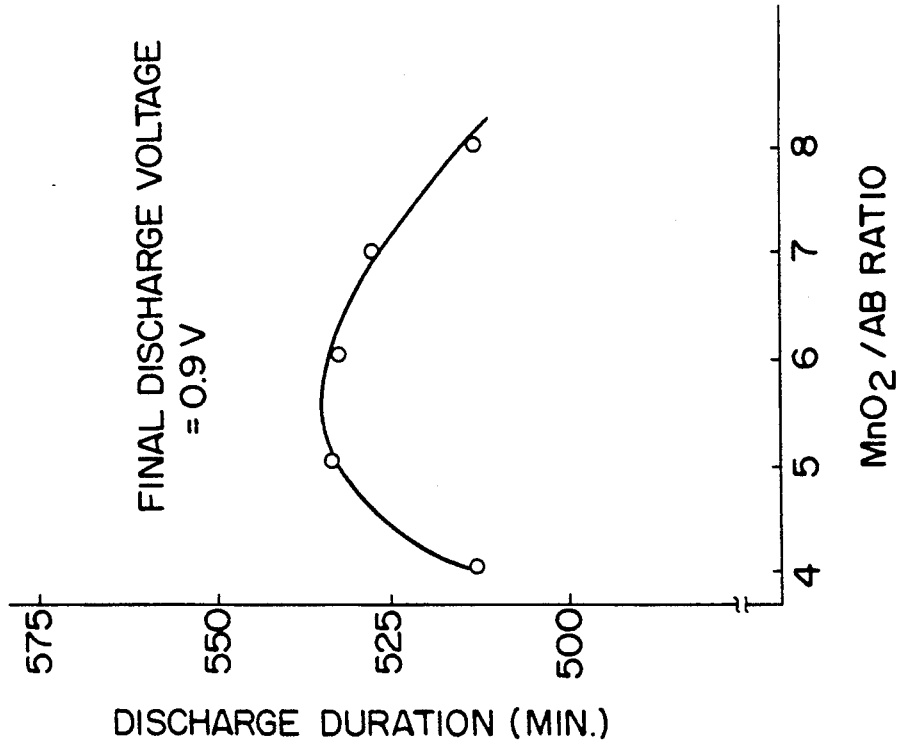
Figure 3:
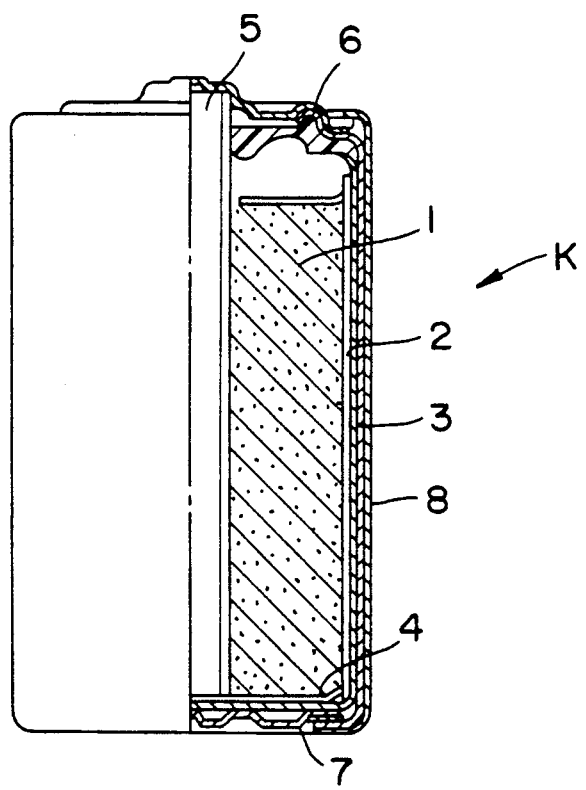
FIG. 3 is a partially sectional front elevational view of a dry cell having a metal jacket, according to the present invention.

Referring now to the drawings, there is shown in FIG. 3, a dry cell K according to one embodiment of the present invention. The dry cell K employs acetylene black having characteristics of Table 1 below.

In FIG. 3, the dry cell K includes bobbin type cathode mixture 1, a separation paper 2 having a paste layer containing electrolyte, a zinc can 3 acting as an anode, a bottom insulating paper 4, a carbon rod 5, a cap 6, a bottom plate 7 and a metal jacket 8. The paste layer of the separation paper 2 is provided on one face of the separation paper 2, which confronts the zinc can 3.

TABLE 1

| Acetylene black Lot No. | Specific surface area (m²/g) |
| --- | --- |
| 1 | 56 |
| 2 | 80 |
| 3 | 120 |
| 4 | 145 |
| 5 | 236 |

Figure 4:
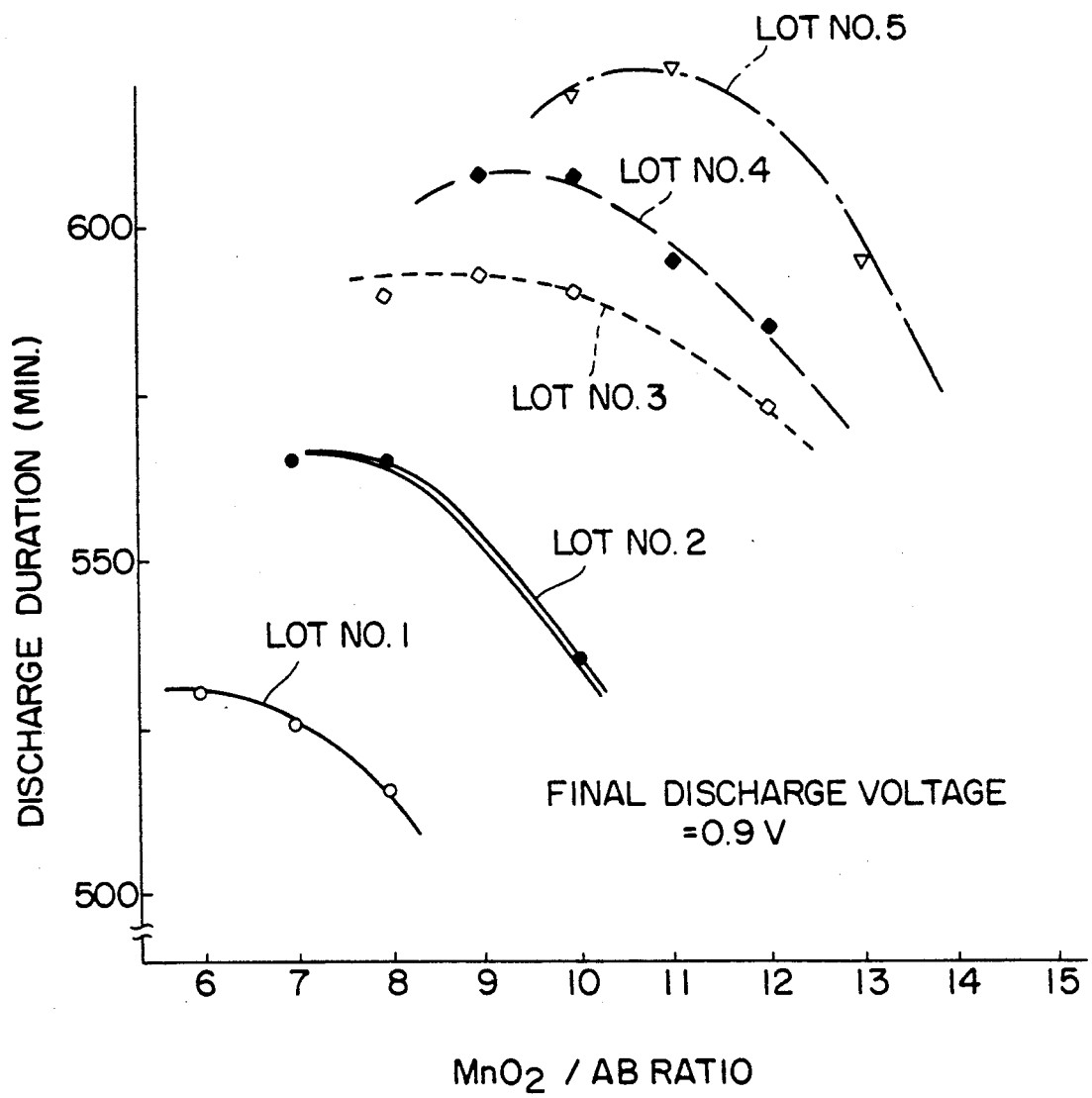
FIGS. 4 and 5 are graphs showing the relation between total discharge duration in 2-Ω load type intermittent electric discharge and $MnO_2/AB$ ratio and relation between discharge efficiency in 2-Ω load type intermittent electric discharge and $MnO_2/AB$ ratio in the dry cell of FIG. 3 containing cathode mixture having acetylene blacks having different specific surface areas, respectively.
Figure 5:
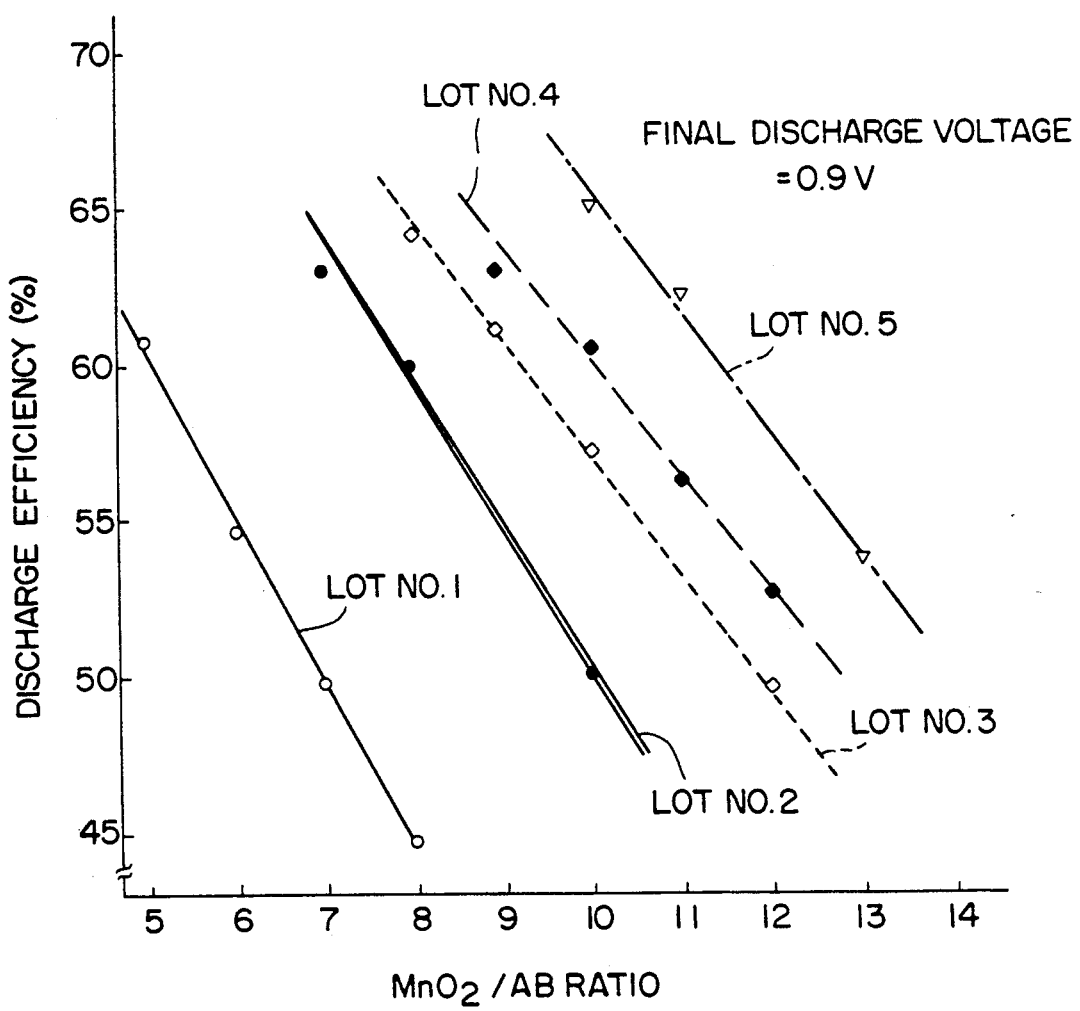

FIGS. 4 and 5 show the relation between total discharge duration in 2-$\Omega$ load type intermittent electric discharge and $MnO_2/AB$ ratio and relation between discharge efficiency in 2-$\Omega$ load type intermittent electric discharge and $MnO_2/AB$ ratio in the dry cell K in which five acetylene blacks of lot Nos. 1 to 5 of Table 1 having different specific surface areas, respectively are mixed with manganese dioxide, respectively. Electrolyte employed at this time consists of 30 wt. % of zinc chloride ($ZnCl_2$), 1.5-1.9 wt. % of ammonium chloride ($NH_4Cl$) and water ($H_2O$) as the remainder. In order to adjust the above described cathode mixture of manganese dioxide ($MnO_2$) and acetylene black, 36-90 parts by weight of, desirably about 60-80 parts by weight of the electrolyte is added to 100 parts by weight of solid matter of the cathode mixture of the manganese dioxide and the acetylene black. Meanwhile, when the electrolyte consists of 25-32.5 wt. % of zinc chloride and 1.5-4.0 wt. % of ammonium chloride, leakage resistance and discharge characteristics of the dry cell K do not pose a problem substantially.

It will be seen from FIGS. 4 and 5 that as the specific surface area of acetylene black becomes larger, the total discharge duration is further increased by adding only a small amount of acetylene black to the cathode mixture, while the dry cell K exhibits excellent discharge efficiency at high $MnO_2/AB$ ratio through relative increase of amount of manganese dioxide ($MnO_2$).

Figure 6:
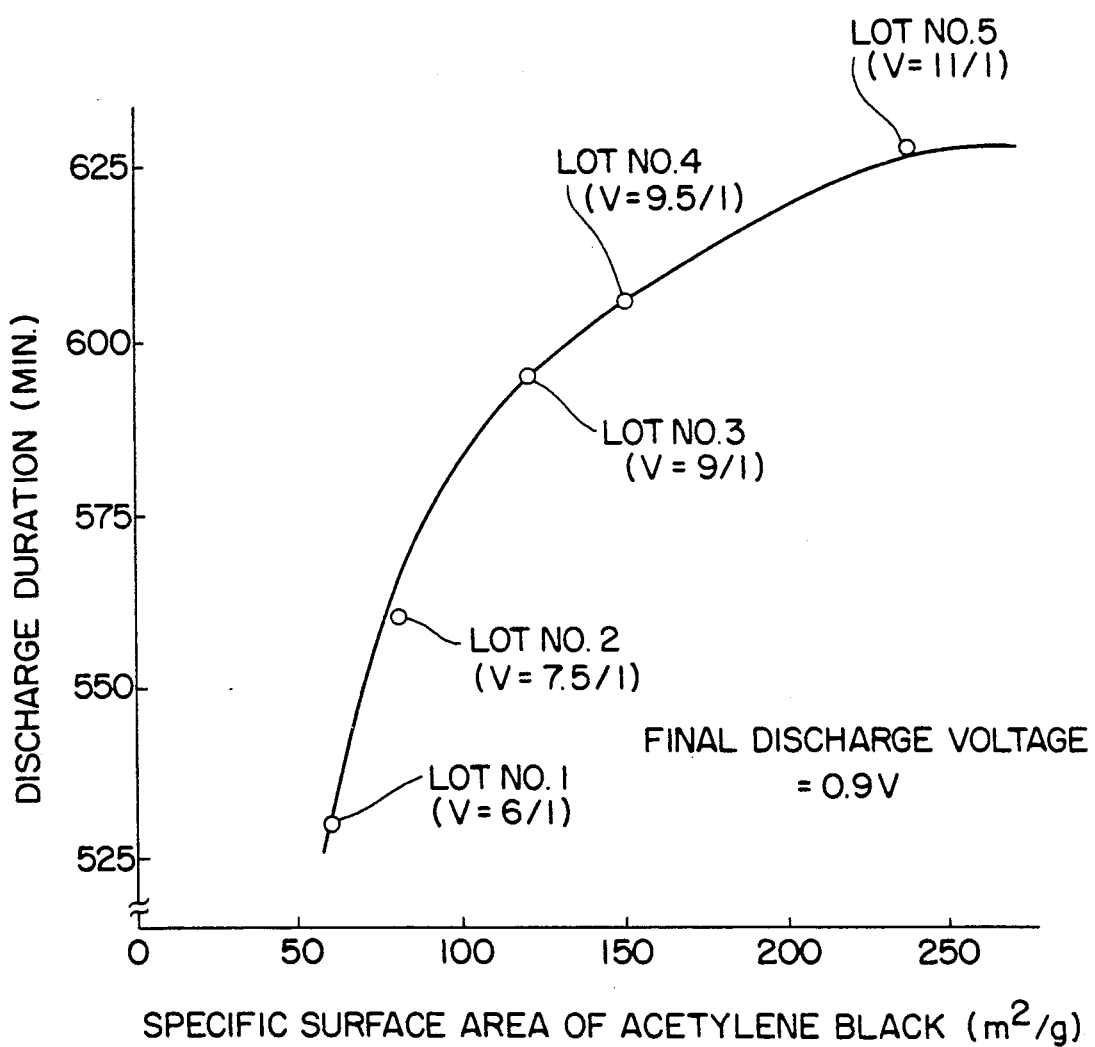
FIG. 6 is a graph showing the relation between total discharge duration in a 2-Ω load type intermittent electric discharge and specific surface area of acetylene black in the dry cell of FIG. 3.

FIG. 6 shows the relation between total discharge duration in 2-$\Omega$ load type intermittent electric discharge and specific surface area of acetylene black in the dry cell of FIG. 3. In FIG. 6, $MnO_2/AB$ ratio of the cathode mixture of the dry cell K is set at a value V which gives a maximum total discharge duration in each lot No. of FIG. 4. As will be seen from FIG. 6, the total discharge duration employing the conventional acetylene black of lot No. 1 is 530 min. On the other hand, in the case where specific surface area of employed acetylene black is disposed between those of the acetylene blacks of lot Nos. 2 and 3 so as to be 100 m²/g or more, preferably 110 m²/g or more, total discharge duration increases 10% or more as compared with 530 min. of the conventional acetylene black of lot No. 1.

Figure 7:
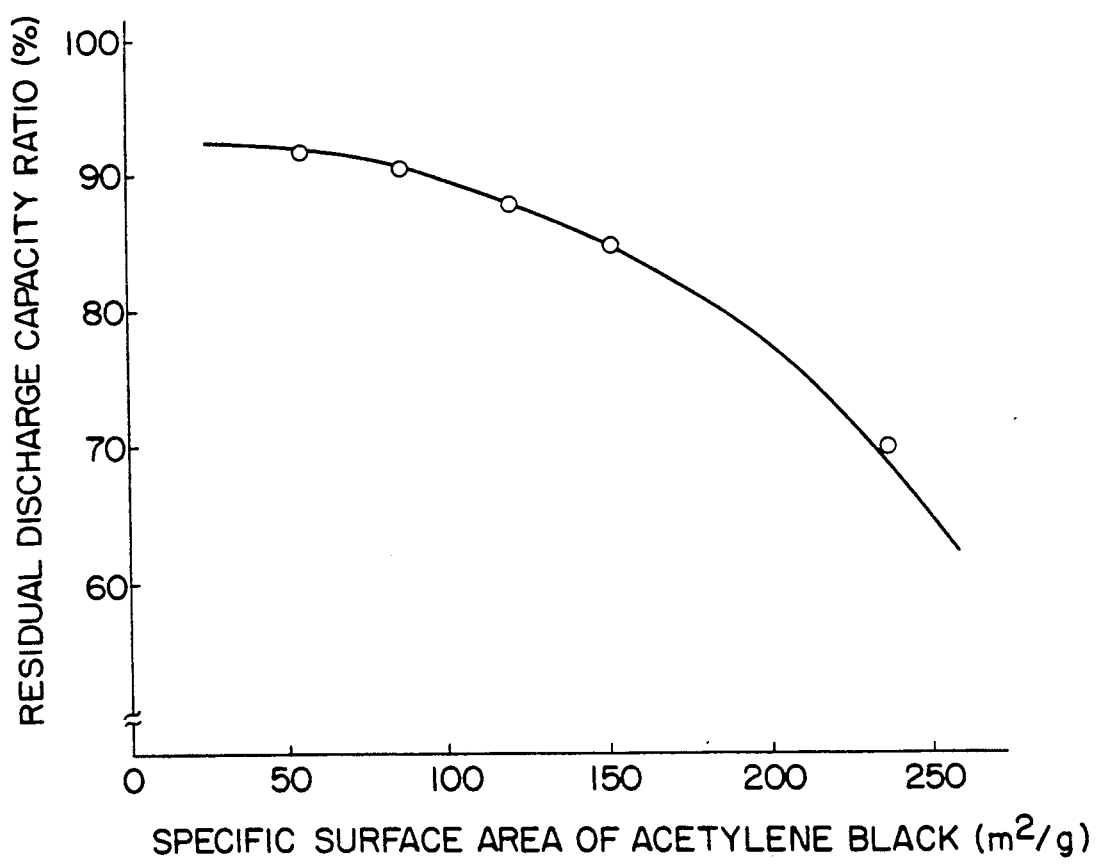
FIG. 7 is a graph showing the relation between specific surface area of acetylene black after storage of the dry cell of FIG. 3 at 45° C. for three months and residual discharge capacity ratio of the dry cell of FIG. 3 at the time of 2-Ω load type intermittent electric discharge.

FIG. 7 shows the relation between specific surface area of acetylene black after storage of the dry cell K at 45° C. for three months and residual discharge capacity ratio after 2-$\Omega$ load type intermittent electric discharge. At this time, $MnO_2/AB$ ratio at which discharge duration of acetylene black of each lot No. of FIG. 4 assumes its maximum is employed as $MnO_2/AB$ ratio of the cathode mixture of the dry cell K. It should be noted that the term "residual discharge capacity ratio" means ratio of discharge duration after storage of the dry cell at 45° C. for three months to discharge duration before the storage of the dry cell on the supposition that the discharge duration before the storage of the dry cell is expressed by 100. It is apparent from FIG. 7 that if the specific surface area of acetylene black is not more than 150 m²/g, preferably not more than 145 m²/g, not less than 85% of discharge capacity obtained before storage of the dry cell K at 45° C. for three months, namely residual discharge capacity ratio of 85% or more can be secured after the storage.

Futhermore, in the case where the specific surface area of acetylene black ranges from 100 to 150 m²/g, $MnO_2/AB$ ratio for giving discharge efficiency of 50% or more is not more than 12/1 as shown in FIG. 5. Therefore, in order to secure discharge duration and discharge efficiency equal to or superior to those of prior art dry cells, it is desirable that $MnO_2/AB$ ratio ranges from 7/1 to 12/1.

Furthermore, if acetylene black having the specific surface area of 110-145 m²/g is employed and $MnO_2/AB$ ratio is so set as to range from 7/1 to 10/1, discharge efficiency of about 60% or more can be secured.

As is clear from the foregoing description, in accordance with the present invention, since acetylene black having a specific surface area of 100 to 150 m²/g is used as conductor so as to be mixed with manganese dioxide ($MnO_2$), amount of the conductor can be reduced to a maximum $MnO_2/AB$ ratio of 12/1 in comparison with the maximum $MnO_2/AB$ ratio of prior art dry cells. Therefore, manganese dioxide ($MnO_2$) can be increased by the reduced amount of the conductor and residual discharge capacity ratio of 85% or more can be secured after storage of the dry cell at 45° C. for three months.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a dry cell comprising an anode made of zinc and cathode mixture which includes manganese dioxide acting as active agent and conductor, the improvement comprising:

acetylene black having a specific surface area of 110 to 150 m²/g measured by a BET type nitrogen gas adsorption method, which is used as the conductor; and a mixing ratio in weight of the manganese dioxide to the acetylene black ranging from 7/1 to 12/1.

2. A dry cell as claimed in claim 1, wherein said cathode mixture includes 100 parts by weight of a mixture of the manganese dioxide and the acetylene black and 36-90 parts by weight of electrolyte, the electrolyte consisting of zinc chloride ammonium chloride and water.

3. A dry cell as claimed in claim 2, wherein the electrolyte contains 25-32.5 wt. % of the zinc chloride and 1.5-4.0 wt. % of the ammonium chloride.

4. A dry cell comprising:

a zinc can which acts as an anode;

a cathode mixture; and a separation paper which is provided, on its one face adjacent to said zinc can, with a paste layer;

said cathode mixture including manganese dioxide acting as active agent, acetylene black and electrolyte such that a mixing ratio in weight of the manganese dioxide to the acetylene black ranges from 7/1 to 10/1;

said cathode mixture including 100 parts by weight of a mixture of the manganese dioxide and the acetylene black and 60–80 parts by weight of the electrolyte;

the acetylene black having a specific surface area of 110 to 145 m$^2$/g measured by a BET type nitrogen gas adsorption method;

the electrolyte containing 30 wt. % of zinc chloride, 1.5–1.9 wt. % of ammonium chloride and water.

* * * * *